United States Patent
Matsunaga et al.

(10) Patent No.: US 11,307,582 B2
(45) Date of Patent: Apr. 19, 2022

(54) VEHICLE CONTROL DEVICE, VEHICLE CONTROL METHOD AND STORAGE MEDIUM

(71) Applicant: HONDA MOTOR CO., LTD., Tokyo (JP)

(72) Inventors: Hideki Matsunaga, Wako (JP); Etsuo Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 627 days.

(21) Appl. No.: 16/297,753

(22) Filed: Mar. 11, 2019

(65) Prior Publication Data

US 2019/0286137 A1 Sep. 19, 2019

(30) Foreign Application Priority Data

Mar. 13, 2018 (JP) .............................. JP2018-045905

(51) Int. Cl.
| | |
|---|---|
| *G05D 1/00* | (2006.01) |
| *G05D 1/02* | (2020.01) |
| *B60Q 1/50* | (2006.01) |
| *G06N 3/08* | (2006.01) |

(52) U.S. Cl.
CPC ............. *G05D 1/0088* (2013.01); *B60Q 1/50* (2013.01); *G05D 1/0221* (2013.01); *G05D 1/0223* (2013.01); *G05D 1/0246* (2013.01); *G05D 1/0257* (2013.01); *G05D 2201/0213* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 8,031,085 B1 * | 10/2011 | Anderson .............. | B60Q 5/008 340/988 |
| 8,571,743 B1 * | 10/2013 | Cullinane ................ | G05D 1/00 701/23 |
| 8,761,991 B1 * | 6/2014 | Ferguson ......... | G08G 1/096725 701/28 |

(Continued)

FOREIGN PATENT DOCUMENTS

JP 2004-268829 9/2004

*Primary Examiner* — Jonathan M Dager
(74) *Attorney, Agent, or Firm* — Amin, Turocy & Watson, LLP

(57) ABSTRACT

A vehicle control device includes a recognition unit which recognizes surrounding situations of a vehicle, and a driving control unit which automatically controls at least steering of the vehicle based on the surrounding situations recognized by the recognition unit, and the driving control unit increases a distance between the vehicle and a traffic participant in the case where the recognition unit recognizes the traffic participant as an overtaking target and a predetermined structure in a traveling direction of the vehicle, and the vehicle travels on a side opposite to the predetermined structure in a road width direction in a case that viewed from the traffic participant to overtake the traffic participant, as compared to a case where the traffic participant as the overtaking target is recognized by the recognition unit in the traveling direction of the vehicle and the predetermined structure is not recognized.

8 Claims, 9 Drawing Sheets

(56) References Cited

U.S. PATENT DOCUMENTS

| | | | | |
|---|---|---|---|---|
| 8,862,383 B2* | 10/2014 | Tsuchida | ............... | G01S 13/931 |
| | | | | 701/301 |
| 8,954,252 B1* | 2/2015 | Urmson | ................ | G08G 1/167 |
| | | | | 701/70 |
| 9,248,834 B1* | 2/2016 | Ferguson | ............ | G05D 1/0088 |
| 9,463,794 B1* | 10/2016 | Silver | ................... | G01C 21/26 |
| 9,475,422 B2* | 10/2016 | Hillis | ...................... | G06F 3/017 |
| 9,507,346 B1* | 11/2016 | Levinson | ............ | G05D 1/0291 |
| 9,855,890 B2* | 1/2018 | James | .................. | B60Q 1/525 |
| 9,855,935 B2* | 1/2018 | Lee | ...................... | G01S 13/867 |
| 9,953,538 B1* | 4/2018 | Matthiesen | ........... | B60Q 1/268 |
| 10,242,272 B2* | 3/2019 | Spampinato | ....... | G06K 9/00805 |
| 10,286,757 B2* | 5/2019 | Sorokin | ................... | B60Q 1/50 |
| 10,331,128 B1* | 6/2019 | Hansel | ................ | G05D 1/0061 |
| 10,336,188 B2* | 7/2019 | Torii | ................ | G06K 9/00845 |
| 10,429,846 B2* | 10/2019 | Nix | ....................... | G05D 1/0212 |
| 10,479,202 B2* | 11/2019 | Torii | ...................... | B60Q 1/268 |
| 10,518,783 B2* | 12/2019 | Tanimichi | ............. | B60W 40/09 |
| 10,522,038 B2* | 12/2019 | Bielby | ................. | G08G 1/0116 |
| 10,627,830 B2* | 4/2020 | Stein | .................. | G05D 1/0231 |
| 10,684,620 B2* | 6/2020 | Park | ..................... | B60W 40/09 |
| 10,699,136 B2* | 6/2020 | Theodosis | .......... | G06K 9/00812 |
| 10,816,973 B2* | 10/2020 | Jiang | ........................ | G06N 3/08 |
| 10,816,985 B2* | 10/2020 | Zhang | ................ | G05D 1/0214 |
| 10,821,891 B2* | 11/2020 | Morimura | ............... | B60Q 1/444 |
| 10,889,295 B2* | 1/2021 | Paris | ..................... | G08G 1/166 |
| 10,906,456 B2* | 2/2021 | Sorokin | ................. | G08G 1/22 |
| 10,926,760 B2* | 2/2021 | Katsuki | ............... | G06K 9/00805 |
| 11,001,196 B1* | 5/2021 | Alexander | ............... | B60Q 1/50 |
| 11,024,162 B2* | 6/2021 | Zavesky | ............. | G08G 1/0116 |
| 11,145,063 B2* | 10/2021 | Umegatani | ............. | G06T 7/593 |
| 2007/0274566 A1* | 11/2007 | Fujimoto | ........... | G06K 9/00798 |
| | | | | 382/103 |
| 2008/0042812 A1* | 2/2008 | Dunsmoir | .......... | G06K 9/00818 |
| | | | | 340/435 |
| 2008/0162027 A1* | 7/2008 | Murphy | ............... | G05D 1/0246 |
| | | | | 701/117 |
| 2008/0309468 A1* | 12/2008 | Greene | ................ | G08G 1/165 |
| | | | | 340/436 |
| 2010/0076621 A1* | 3/2010 | Kubotani | ................ | G08G 1/166 |
| | | | | 701/1 |
| 2010/0201509 A1* | 8/2010 | Hara | ....................... | G08G 1/166 |
| | | | | 340/435 |
| 2010/0324797 A1* | 12/2010 | Fritz | ................... | B60W 10/184 |
| | | | | 701/96 |
| 2011/0140919 A1* | 6/2011 | Hara | ....................... | G08G 1/163 |
| | | | | 340/907 |
| 2011/0199199 A1* | 8/2011 | Perkins | .................. | B60Q 9/008 |
| | | | | 340/435 |
| 2012/0035846 A1* | 2/2012 | Sakamoto | ............... | G08G 1/166 |
| | | | | 701/301 |
| 2014/0062685 A1* | 3/2014 | Tamatsu | ................. | G08G 1/163 |
| | | | | 340/425.5 |
| 2014/0307247 A1* | 10/2014 | Zhu | ....................... | G01S 13/867 |
| | | | | 356/4.01 |
| 2015/0228195 A1* | 8/2015 | Beaurepaire | ............ | B60Q 1/50 |
| | | | | 340/907 |
| 2015/0266477 A1* | 9/2015 | Schmudderich | ...... | B60W 40/04 |
| | | | | 701/98 |
| 2015/0268665 A1* | 9/2015 | Ludwick | ................ | B60Q 5/008 |
| | | | | 701/23 |
| 2015/0298693 A1* | 10/2015 | Uechi | ....................... | B60T 7/22 |
| | | | | 701/70 |
| 2015/0329043 A1* | 11/2015 | Skvarce | .................. | B60R 21/34 |
| | | | | 340/435 |
| 2015/0332114 A1* | 11/2015 | Springer | ................ | G08G 1/167 |
| | | | | 348/148 |
| 2015/0336502 A1* | 11/2015 | Hillis | ...................... | G06F 3/017 |
| | | | | 701/23 |
| 2016/0179094 A1* | 6/2016 | Sorokin | .................... | B60Q 1/50 |
| | | | | 701/23 |
| 2016/0231746 A1* | 8/2016 | Hazelton | ............ | G01S 13/867 |
| 2016/0291134 A1* | 10/2016 | Droz | .................... | G01S 7/4802 |
| 2016/0311431 A1* | 10/2016 | Kato | ..................... | G01C 21/3617 |
| 2016/0335892 A1* | 11/2016 | Okada | ................... | G08G 1/123 |
| 2017/0270374 A1* | 9/2017 | Myers | ................ | G06K 9/00369 |
| 2017/0327110 A1* | 11/2017 | Inoue | .................. | B60W 30/095 |
| 2017/0327112 A1* | 11/2017 | Yokoyama | ......... | G06K 9/00335 |
| 2017/0329332 A1* | 11/2017 | Pilarski | ............... | B60W 30/0956 |
| 2018/0038689 A1* | 2/2018 | Takemura | .............. | G06K 9/036 |
| 2018/0072218 A1* | 3/2018 | Sweeney | ................ | B60Q 1/50 |
| 2018/0096605 A1* | 4/2018 | Bai | ........................ | G08G 1/161 |
| 2018/0114074 A1* | 4/2018 | Baba | .................... | G06K 9/6202 |
| 2018/0124423 A1* | 5/2018 | Choi | ................... | G06N 3/0445 |
| 2018/0154889 A1* | 6/2018 | Minemura | ............. | G08G 1/163 |
| 2018/0182247 A1* | 6/2018 | Baba | .................... | B60W 30/09 |
| 2019/0056741 A1* | 2/2019 | Zych | ..................... | G08G 1/165 |
| 2019/0088136 A1* | 3/2019 | Nagata | .................... | G08G 1/166 |
| 2019/0122037 A1* | 4/2019 | Russell | ............... | G06K 9/00805 |
| 2019/0220016 A1* | 7/2019 | Phillips | .................. | G01C 21/20 |
| 2019/0283802 A1* | 9/2019 | Matsunaga | ........ | B62D 15/0265 |
| 2019/0291724 A1* | 9/2019 | Katsuki | ............... | B60W 10/184 |
| 2019/0329768 A1* | 10/2019 | Shalev-Shwartz | ......................... |
| | | | | G06K 9/00791 |
| 2019/0329769 A1* | 10/2019 | Shalev-Shwartz | ... | G05D 1/0214 |
| 2019/0377354 A1* | 12/2019 | Shalev-Shwartz | ... | G05D 1/0231 |
| 2020/0117192 A1* | 4/2020 | Satoh | ....................... | G08G 1/16 |
| 2020/0279487 A1* | 9/2020 | Toda | ................... | B60W 30/0956 |
| 2020/0391765 A1* | 12/2020 | Jia | ....................... | B60W 50/035 |
| 2021/0024088 A1* | 1/2021 | El-Bahrawy | ........... | G06F 30/20 |
| 2021/0157325 A1* | 5/2021 | Beller | ................ | G06K 9/00805 |
| 2021/0229656 A1* | 7/2021 | Dax | ...................... | B60W 30/09 |
| 2021/0287529 A1* | 9/2021 | Beauchamp | ............ | H04W 4/44 |

* cited by examiner

| ADVERSE EFFECT CONDITION ||||ADVERSE EFFECT LEVEL|
|---|---|---|---|---|
| DISTANCE TO SIDE GUTTER [cm] | GUTTER WIDTH [cm] | GUTTER DEPTH [cm] | PRESENCE OR ABSENCE OF GUTTER | |
| 10~30 | *** | *** | NONE | 4 |
| 10~30 | *** | *** | PRESENT | 3 |
| 30~50 | *** | *** | NONE | 3 |
| 50~100 | *** | *** | NONE | 2 |
| 100 OR MORE | *** | *** | *** | 1 |
| ... | ... | ... | ... | ... |

| ADVERSE EFFECT LEVEL | NOTIFICATION CONTENT | NOTIFICATION START DISTANCE [m] |
|---|---|---|
| 4 | SPEECH MESSAGE | 15 |
| 3 | SPEECH MESSAGE+HORN (WEAK) | 10 |
| 2 | SPEECH MESSAGE+HORN (INTERMEDIATE) | 8 |
| 1 | SPEECH MESSAGE+HORN (STRONG) | 5 |
| ... | ... | ... |

VEHICLE CONTROL DEVICE, VEHICLE CONTROL METHOD AND STORAGE MEDIUM

CROSS-REFERENCE TO RELATED APPLICATION

Priority is claimed on Japanese Patent Application No. 2018-045905 filed Mar. 13, 2018, the content of which is incorporated herein by reference.

BACKGROUND

Field of the Invention

The present invention relates to a vehicle control device, a vehicle control method, and a storage medium.

Description of Related Art

Conventionally, a technique relating to a driving support device is known in which, in a predetermined vehicle width zone which is set along a predicted trajectory of an own vehicle and a pedestrian incursion zone which is set based on a maximum moving speed of the pedestrian and a speed of the own vehicle, an area within a predetermined distance from the own vehicle is set as a collision risk zone, a degree of collision risk is determined in accordance with whether or not the pedestrian is positioned within the collision risk zone, and the determined result is notified to a driver (for example, Japanese Unexamined Patent Application Publication No. 2004-268829).

SUMMARY

However, in a conventional technique, the fact that the behavior of a pedestrian may be restricted depending on surrounding situations around the pedestrian has not been considered. If the vehicle is an automatically driven vehicle, the surrounding situations around a traveling road are automatically recognized and speed control and steering control of the vehicle are automatically performed. However, driving control based on the surrounding situations, assuming that the behavior of the pedestrian may be limited, has not been realized.

Aspects of the present invention have been made in view of such circumstances, and it is an object of the present invention to provide a vehicle control device, a vehicle control method, and a storage medium which can realize more preferable driving control by taking into account that the behavior of a traffic participant may be restricted by surrounding situations.

The vehicle control device, the vehicle control method, and the storage medium according to the present invention adopt the following configuration.

(1): A vehicle control device according to an aspect of the present invention is a vehicle control device including a recognition unit which recognizes surrounding situations of a vehicle, and a driving control unit which automatically controls at least steering of the vehicle based on the surrounding situations recognized by the recognition unit, in which the driving control unit increases a distance between the vehicle and a traffic participant in the case where the recognition unit recognizes the traffic participant as an overtaking target and a predetermined structure in a traveling direction of the vehicle, and the vehicle travels on a side opposite to the predetermined structure in a road width direction in a case that viewed from the traffic participant to overtake the traffic participant, as compared to a case where the traffic participant as the overtaking target is recognized by the recognition unit in the traveling direction of the vehicle and the predetermined structure is not recognized.

(2): In the above aspect (1), the recognition unit may recognize the distance in the road width direction between the traffic participant and the predetermined structure, and the driving control unit inhibits control for overtaking the traffic participant in a case that the distance is within a predetermined distance.

(3): In the above aspect (2), the recognition unit may further include a vehicle recognition determination unit which determines whether or not the traffic participant has recognized the vehicle, and the driving control unit executes the control for overtaking the traffic participant in a case that the vehicle recognition determination unit determines that the traffic participant has recognized the presence of the vehicle.

(4): In the above aspect (1), the recognition unit further includes a vehicle recognition determination unit which determines whether or not the traffic participant has recognized the vehicle, and the driving control unit causes the vehicle to travel with an interval equal to or greater than a second minimum interval between the vehicle and the traffic participant in the case where the recognition unit recognizes the traffic participant and the predetermined structure in the traveling direction of the vehicle, the vehicle recognition determination unit determines that the traffic participant has not recognized the presence of the vehicle, and the vehicle travels on the opposite side to overtake the traffic participant, the driving control unit causes the vehicle to travel with an interval equal to or greater than a third minimum interval which is shorter than the second minimum interval between the vehicle and the traffic participant in the case where the vehicle recognition determination unit determines that the traffic participant has recognized the presence of the vehicle, and the driving control unit causes the vehicle to travel with an interval equal to or greater than a first minimum interval which is shorter than the third minimum interval between the vehicle and the traffic participant in other cases.

(5): In the above aspect (1), the predetermined structure may be a structure which has a length extending along a road less than a predetermined distance.

(6): In the above aspect (1), the recognition unit may recognize a type of predetermined structure, and the vehicle control device may further include an outside of vehicle notification unit which notifies information outside the vehicle, and an outside of vehicle notification control unit which derives an adverse effect level, which is a result of evaluating adverse effects of the traffic participant approaching the predetermined structure, based on the type of predetermined structure recognized by the recognition unit, and output information on the derived adverse effect level to the outside of vehicle notification unit.

(7): A vehicle control method according to an aspect of the present invention is a vehicle control method which causes a vehicle control device to execute the processing of recognizing surrounding situations of a vehicle, automatically controlling at least steering of the vehicle based on the recognized surrounding situations, and increasing a distance between the vehicle and a traffic participant in the case where the traffic participant as an overtaking target and a predetermined structure are recognized in a traveling direction of the vehicle, and the vehicle travels on a side opposite to the predetermined structure in a road width direction in a case that viewed from the traffic participant to overtake the traffic participant, as compared to a case where the traffic participant as the overtaking target is recognized in the traveling direction of the vehicle and the predetermined structure is not recognized.

(8): A storage medium according to an aspect of the present invention is a computer-readable non-temporary storage medium storing a program which causes a vehicle control device to execute the processing of recognizing surrounding situations of a vehicle, automatically controlling at least steering of the vehicle based on the recognized surrounding situations, and increasing a distance between the vehicle and a traffic participant in the case where the traffic participant as an overtaking target and a predetermined structure are recognized in a traveling direction of the vehicle, and the vehicle travels on a side opposite to the predetermined structure in a road width direction in a case that viewed from the traffic participant to overtake the traffic participant, as compared to a case where the traffic participant as the overtaking target is recognized in the traveling direction of the vehicle and the predetermined structure is not recognized.

According to the above aspects (1) to (8), it is possible to realize more preferable driving control by taking into account that the behavior of the traffic participant may be restricted by the surrounding situations.

BRIEF DESCRIPTION OF THE DRAWINGS

FIG. 7 is a diagram showing an example of contents of adverse effect level information.

FIG. 8 is a diagram showing an example of contents of notification information.

DESCRIPTION OF EMBODIMENTS

Hereinafter, embodiments of a vehicle control device, a vehicle control method, and a storage medium according to the present invention will be described with reference to the drawings. In the following, although a case where left-hand traffic regulations are applied will be described, left and right can be read reversely in a case that right-hand traffic regulations are applied.

[Overall Structure]

Figure 1:
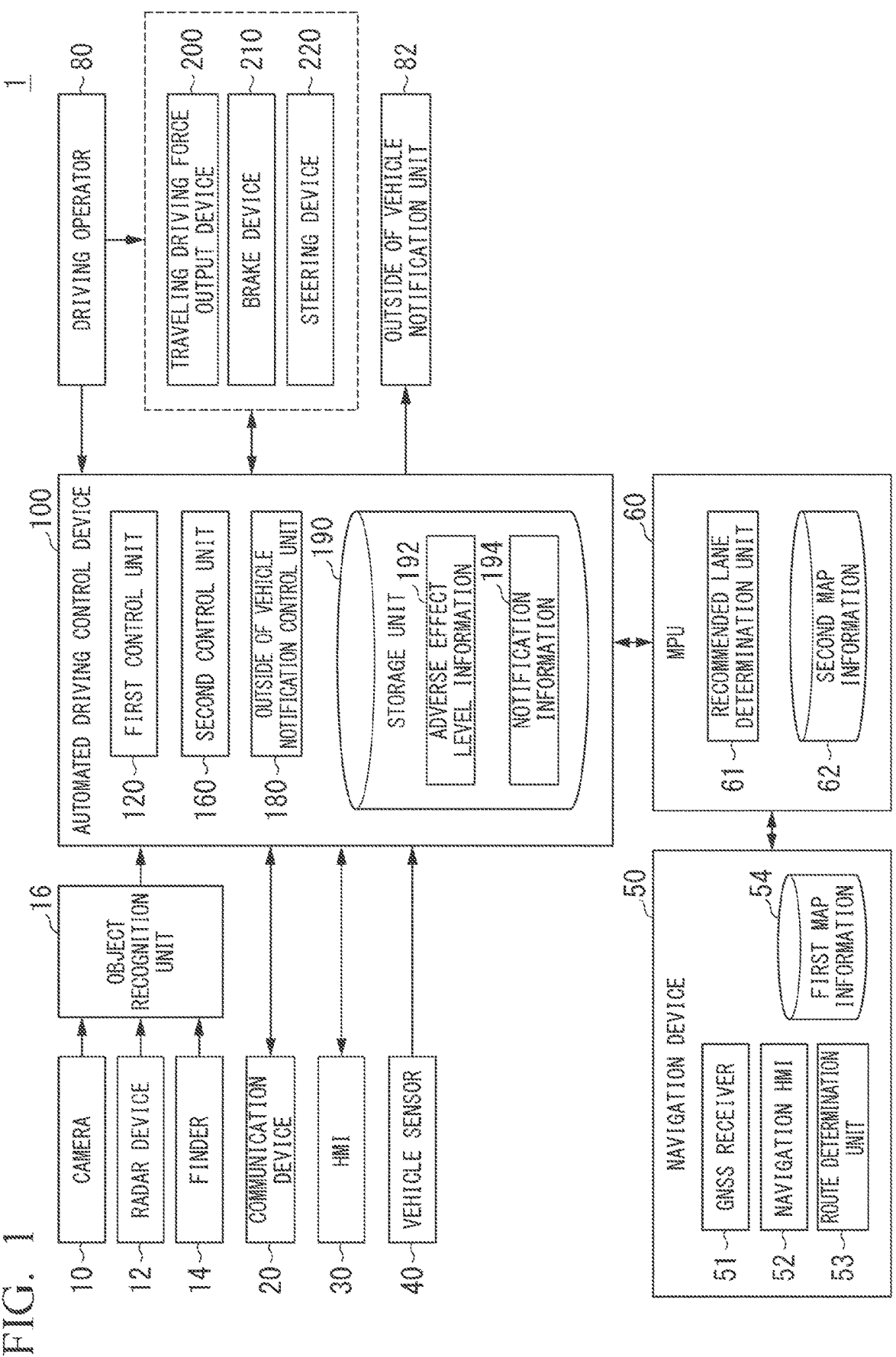
FIG. 1 is a configuration diagram of a vehicle system using a vehicle control device according to an embodiment.

FIG. 1 is a configuration diagram of a vehicle system 1 using a vehicle control device according to an embodiment. A vehicle on which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine, or electric power discharged by a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an outside of vehicle notification unit 82, an automated driving control device 100, a traveling driving force output device 200, a brake device 210, and a steering device 220. These devices and instruments are connected to each other through a multiplex communication line such as a controller area network (CAN) communication line, a serial communication line, a wireless communication network or the like. The configuration shown in FIG. 1 is merely an example, and a part of the configuration may be omitted, or other constituents may be added. The automated driving control device 100 is an example of a "vehicle control device."

The camera 10 is, for example, a digital camera using a solid-state imaging device such as a charge coupled device (CCD) or a complementary metal oxide semiconductor (CMOS). The camera 10 is attached to an arbitrary place on the vehicle (hereinafter referred to as the own vehicle M) on which the vehicle system 1 is mounted. When imaging in front, the camera 10 is attached to an upper portion of a front windshield, a rear surface of a rearview mirror, or the like. For example, the camera 10 repeats imaging the vicinity of the own vehicle M periodically. The camera 10 may be a stereo camera.

The radar device 12 radiates radio waves such as millimeter waves around the own vehicle M and detects at least a position (distance to and direction) of an object by detecting radio waves (reflected waves) reflected by the object. The radar device 12 is attached to an arbitrary place on the own vehicle M. The radar device 12 may detect a position and velocity of the object using a frequency modulated continuous wave (FM-CW) method.

The finder 14 is a light detection and ranging (LIDAR) finder. The finder 14 radiates light around the own vehicle M and measures scattered light. The finder 14 detects a distance to an object based on the time from light emission to light reception. The radiated light is, for example, a pulsed laser light. The finder 14 is attached to an arbitrary place on the own vehicle M.

The object recognition device 16 performs a sensor fusion process on the detection results of some or all of the camera 10, the radar device 12, and the finder 14 to recognize the position, type, speed, and the like of an object. The object recognition device 16 outputs the recognition results to the automated driving control device 100. The object recognition device 16 may directly output the detection results of the camera 10, the radar device 12, and the finder 14 to the automated driving control device 100. The object recognition device 16 may be omitted from the vehicle system 1.

The communication device 20 communicates with other vehicles located in the vicinity of the own vehicle M using a cellular network, a Wi-Fi network, Bluetooth (a registered trademark), dedicated short range communication (DSRC) or the like, or communicates with various server devices via a base station.

The HMI 30 provides various kinds of information to an occupant of the vehicle M and receives input operations by the occupant. The HMI 30 includes various display devices, speakers, buzzers, touch panels, switches, keys, and the like.

The vehicle sensor 40 includes a vehicle speed sensor that detects the speed of the vehicle M, an acceleration sensor that detects the acceleration, a yaw rate sensor that detects the angular velocity around the vertical axis, a direction sensor that detects the direction of the vehicle M, and the like.

The navigation device 50 includes, for example, a global navigation satellite system (GNSS) receiver 51, a navigation HMI 52, and a route determination unit 53. The navigation device 50 holds a first map information 54 in a storage device such as a hard disk drive (HDD) or a flash memory. The GNSS receiver 51 specifies the position of the own vehicle M based on signals received from a GNSS satellite. The position of the own vehicle M may be specified or supplemented by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. The route determination unit 53 refers to the first map information 54 to determine a route (hereinafter referred to as an on-map route) from a position of the own vehicle M identified by the GNSS receiver 51 (or an arbitrary input position) to a destination entered by the occupant using the navigation HMI 52, for example. The first map information 54 is, for example, information in which a road shape is expressed by links indicating roads and nodes connected by the links. The first map information 54 may include curvatures of the roads, point of interest (POI) information, and the like. The on-map route is output to the MPU 60. The navigation device 50 may perform route guidance using the navigation HMI 52 based on the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire a route equivalent to the on-map route from the navigation server.

The MPU 60 includes, for example, a recommended lane determination unit 61, and holds second map information 62 in a storage device such as an HDD or a flash memory. The recommended lane determination unit 61 divides the on-map route provided from the navigation device 50 into a plurality of blocks (for example, divides the on-map route at intervals of 100 [m] with respect to a traveling direction of the vehicle) and determines a recommended lane for each block with reference to the second map information 62. The recommended lane determination unit 61 determines the lane numbered from the left on which to travel. In a case that there is a branch point in the on-map route, the recommended lane determination unit 61 determines the recommended lane such that the own vehicle M can travel on a reasonable route for proceeding to a branch destination.

The second map information 62 is map information with higher accuracy than the first map information 54. The second map information 62 includes, for example, information on a center of a lane or information on a boundary of a lane. The second map information 62 may include road information, traffic regulations information, address information (address/zip code), facility information, telephone number information, and the like. The second map information 62 may be updated at any time by the communication device 20 communicating with another device.

The driving operator 80 includes, for example, an accelerator pedal, a brake pedal, a shift lever, a steering wheel, a steering wheel variant, a joystick, and other operators. A sensor for detecting an amount of an operation or the presence or absence of an operation is attached to the driving operator 80, and the detection results are output to some or all of the automated driving control device 100, the traveling driving force output device 200, the brake device 210, and the steering device 220.

The outside of vehicle notification unit 82 includes, for example, a speaker. The outside of vehicle notification unit 82 outputs predetermined speech from a speaker to the outside of the vehicle based on a notification start instruction from an outside of vehicle notification control unit 180.

The automated driving control device 100 includes, for example, a first control unit 120, a second control unit 160, an outside of vehicle notification control unit 180, and a storage unit 190. Each of these constituent elements is realized, for example, by a hardware processor such as a central processing unit (CPU) executing a program (software). Some or all of these constituent elements may be realized by hardware (circuit units; including circuitry) such as a large-scale integration (LSI), an application specific integrated circuit (ASIC), a field-programmable gate array (FPGA), a graphics processing unit (GPU), or may be realized by cooperation between software and hardware. The program may be stored in advance in a storage device such as an HDD or a flash memory of the automated driving control device 100, or may be stored in a detachable storage medium such as a DVD or a CD-ROM to be installed in an HDD or a flash memory of the automated driving control device 100 when the storage medium is mounted on a drive device. A combination of an action plan generation unit 140 and the second control unit 160 is an example of a "driving control unit." The driving control unit automatically controls at least steering between the speed or steering of the own vehicle M based on surrounding situations recognized by a recognition unit 130.

Figure 2:
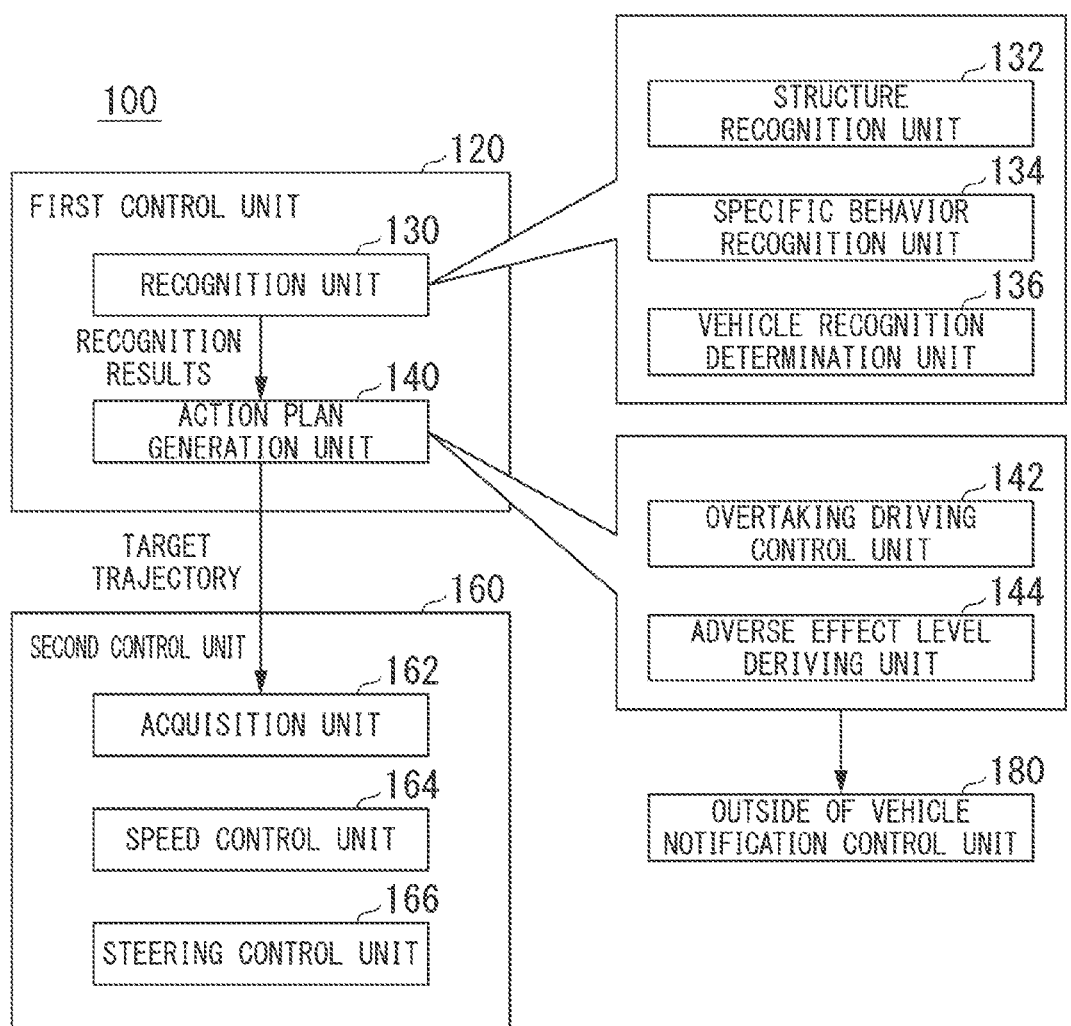
FIG. 2 is a functional configuration diagram of a first control unit, a second control unit, and an outside of vehicle notification control unit.

FIG. 2 is a functional configuration diagram of the first control unit 120, the second control unit 160, and the outside of vehicle notification control unit 180. The first control unit 120 includes, for example, the recognition unit 130 and the action plan generation unit 140. For example, the first control unit 120 realizes a function based on artificial intelligence (AI) and a function based on a pre-given model in parallel. For example, a function of "recognizing an intersection" may be realized by performing in parallel a recognition of an intersection by deep learning and the like and a recognition based on pre-given conditions (signals capable of pattern matching, road signs, etc.), scoring and comprehensively evaluating both recognitions. This ensures the reliability of automated driving.

The recognition unit 130 recognizes positions of objects in the vicinity of the own vehicle M and states such as the speed and acceleration based on the information input from the camera 10, the radar device 12, and the finder 14 via the object recognition device 16. The objects include obstacles like moving bodies such as traffic participants and other vehicles, and construction sites or the like. The traffic participants are, for example, moving bodies that are present on a road on which the own vehicle M travels and are expected to travel at a lower speed than the traveling speed of the vehicle M. The traffic participants include, for example, pedestrians, bicycles, and wheelchairs. Hereinafter, explanation will be given with regard to pedestrians among these traffic participants. The position of an object is, for example, recognized as a position on absolute coordinates whose origin is a representative point (a center of gravity, a center of a driving axis, etc.) of the own vehicle M and used for control. The position of the object may be represented by a representative point such as a center of gravity or a corner of the object, or may be represented by a representative area. In the case where the object is another vehicle, the "state" of the object may include the acceleration or jerk of the object, or a "behavior state" (for example, whether or not it is changing lane or is going to change lane). In the case where the object is a pedestrian, the "state" of the object may include a direction in which the object moves, or a "behavior state" (for example, whether or not it is crossing the road or is going to cross the road).

For example, the recognition unit 130 recognizes a lane (traveling lane) on which the own vehicle M is traveling. For example, the recognition unit 130 recognizes the traveling lane by comparing a pattern of lane dividing lines (for example, an arrangement of solid lines and broken lines) obtained from the second map information 62 with a pattern of lane dividing lines around the own vehicle M recognized from images captured by the camera 10. The recognition unit 130 may recognize the traveling lane by recognizing not only lane dividing lines but also traveling lane boundaries (road boundaries) including lane dividing lines, road shoulders, curb stones, median strips, guard rails, or the like. In this recognition, the position of the own vehicle M acquired from the navigation device 50 or a processing result of INS may be reflected. The recognition unit 130 recognizes a road width on which the own vehicle M travels. In this case, the recognition unit 130 may recognize the road width from images captured by the camera 10, or may recognize the road width from the lane dividing lines obtained from the second map information 62. The recognition unit 130 may recognize a width (for example, a width of another vehicle), a height, a shape, and the like of an obstacle based on images captured by the camera 10. The recognition unit 130 recognizes a stop line, a red light, a toll booth, and other road events.

The recognition unit 130 recognizes a position and a posture of the own vehicle M with respect to a traveling lane when recognizing the travel lane. For example, the recognition unit 130 may recognize a deviation of the representative point of the own vehicle M from a center of the lane and an angle formed with respect to a line connecting the center of the lane in the traveling direction of the own vehicle M as a relative position and a posture of the own vehicle M with respect to the traveling lane. Alternatively, the recognition unit 130 may recognize the position or the like of the representative point of the own vehicle M with respect to one side end (the lane dividing line or the road boundary) of the traveling lane as a relative position of the own vehicle M with respect to the traveling lane. The recognition unit 130 may recognize a structure on the road (for example, a utility pole, a median strip, etc.) based on the first map information 54 or the second map information 62. Functions of a structure recognition unit 132, a specific behavior recognition unit 134, and a vehicle recognition determination unit 136 of the recognition unit 130 will be described later.

In principle, the action plan generation unit 140 generates a target trajectory on which the own vehicle M will automatically travel (independently of the driver's operation) in the future so that the own vehicle M can travel on a recommended lane determined by the recommended lane determination unit 61 and can cope with surrounding situations of the own vehicle M. The target trajectory is a target trajectory through which the representative point of the own vehicle M passes. The target trajectory includes, for example, a velocity element. For example, the target trajectory is expressed as a sequence of points (trajectory points) to be reached by the own vehicle M. A trajectory point is a point to be reached by the own vehicle M for each of predetermined travel distances (for example, about several [m]) along a road, and apart from that, a target speed and a target acceleration for each predetermined sampling time (for example, every several tenths of a [sec]) are generated as a part of the target trajectory. The trajectory point may be a position which the own vehicle M should reach at the sampling time for every predetermined sampling time. In this case, the information on the target speed and the target acceleration is represented based on intervals between the trajectory points.

The action plan generation unit 140 may set automated driving events in generating the target trajectory. There are a constant speed traveling event, a low speed following traveling event, a lane change event, a branching event, a converging event, a takeover event, and the like in the automated driving events. The action plan generation unit 140 generates the target trajectory according to the activated event. Functions of an overtaking driving control unit 142 and an adverse effect level deriving unit 144 of the action plan generation unit 140 will be described later.

The second control unit 160 controls the traveling driving force output device 200, the brake device 210, and the steering device 220 such that the own vehicle M passes along the target trajectory generated by the action plan generation unit 140 at scheduled times.

The second control unit 160 includes, for example, an acquisition unit 162, a speed control unit 164, and a steering control unit 166. The acquisition unit 162 acquires the information of the target trajectory (trajectory points) generated by the action plan generation unit 140, and stores it in a memory (not shown). The speed control unit 164 controls the traveling driving force output device 200 or the brake device 210 based on speed elements associated with the target trajectory stored in the memory. The steering control unit 166 controls the steering device 220 in accordance with curvature degrees of the target trajectory stored in the memory. Processing of the speed control unit 164 and the steering control unit 166 is realized by a combination of feedforward control and feedback control, for example. As one example, the steering control unit 166 executes feed forward control in accordance with a curvature of the road ahead of the own vehicle M in combination with feedback control based on a deviation from the target trajectory.

In a case that a driving control for overtaking a pedestrian is executed by the overtaking driving control unit 142, the outside of vehicle notification control unit 180 causes the outside of vehicle notification unit 82 to notify the outside of the vehicle that the vehicle is overtaking the pedestrian. The outside of vehicle notification control unit 180 may control a type and volume of speech output from the outside of vehicle notification unit 82, a notification time, and the like. Details of functions of the outside of vehicle notification control unit 180 will be described later.

The storage unit 190 is realized by an HDD, a flash memory, a random access memory (RAM), a read only memory (ROM), or the like. In the storage unit 190, for example, adverse effect level information 192, notification information 194 and other information are stored. Details of the adverse effect level information 192 and the notification information 194 will be described later.

The traveling driving force output device 200 outputs a traveling driving force (torque) for driving the vehicle to driving wheels. The traveling driving force output device 200 includes, for example, a combination of an internal combustion engine, an electric motor, a transmission, and the like, and an ECU that controls them. The ECU controls the above constituents in accordance with information input from the second control unit 160 or information input from the driving operator 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor in accordance with the information input from the second control unit 160 or the information input from the driving operator 80 so that a brake torque corresponding to a braking operation is output to each wheel. The brake device 210 may include a mechanism for transferring the hydraulic pressure generated by an operation of a brake pedal included in the driving operator 80 to the cylinder via a master cylinder as a backup. The brake device 210 is not limited to the above-described configuration, and may be an electronically controlled hydraulic brake device that controls an actuator in accordance with the information input from the second control unit 160 to transmit the hydraulic pressure of the master cylinder to the cylinder.

The steering device 220 includes, for example, a steering ECU and an electric motor. The electric motor, for example, changes a direction of steering wheels by applying a force to a rack and pinion mechanism. The steering ECU drives the electric motor in accordance with the information input from the second control unit 160 or the information input from the driving operator 80 to change the direction of the steering wheels.

[Function of Structure Recognition Unit]

The structure recognition unit 132 recognizes a predetermined structure present on a road on which the own vehicle M travels. The predetermined structure is a road structure over which a pedestrian cannot pass or a traffic obstructing factor which is difficult to pass through. For example, the predetermined structure is a side gutter provided at a side of the road, a lid placed on the side gutter, or a step with a height difference of not less than a predetermined value from a road surface. The predetermined structure may include a water pool or the like which is difficult for a pedestrian to pass through.

Figure 3:
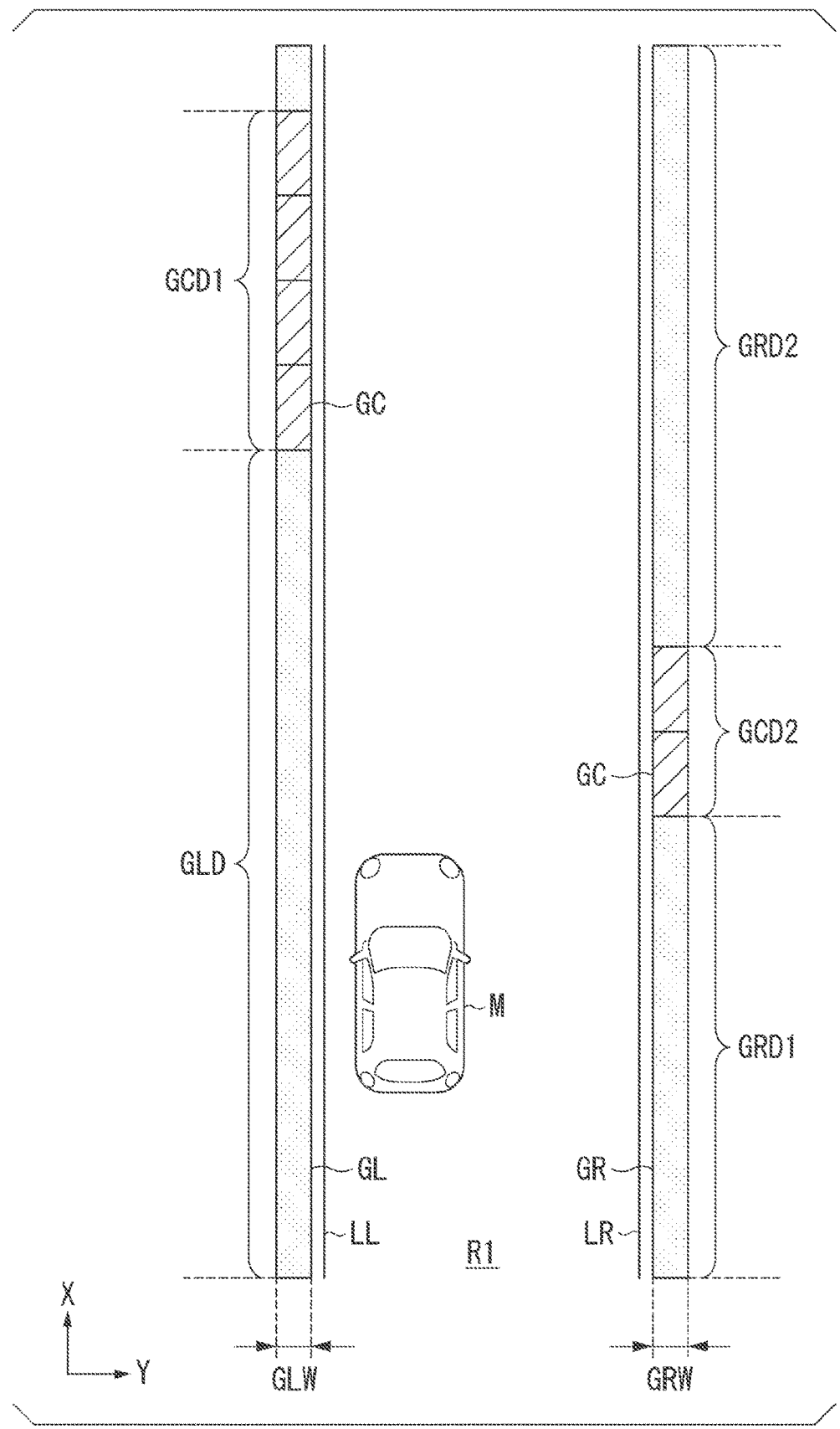
FIG. 3 is a diagram for explaining an example of processing of a structure recognition unit.

FIG. 3 is a diagram for explaining an example of processing of the structure recognition unit 132. In the example of FIG. 3, the own vehicle M is assumed to travel on a road RE For example, the structure recognition unit 132 analyzes images captured by the camera 10 and recognizes a side gutter GL provided in the vicinity of a road end (a lane dividing line LL) on the left side of the road R1 based on luminance information of the analyzed images. In addition to or instead of the side gutter GL, the structure recognition unit 132 may recognize a side gutter GR provided in the vicinity of a road end (lane dividing line LR) on the right side of the road RE The vicinity of a road end means, for example, a range within a predetermined distance from a road end. The side gutters GL and GR are, for example, gutters for draining rainwater or the like on the road surface of the road R1 and are recessed objects buried in the ground to extend along the lane dividing line LL or LR.

For example, the structure recognition unit 132 recognizes respective widths GLW and GRW of the side gutters GL and GR, and recognizes them as gutters in a case that the widths GLW and GRW are equal to or larger than a predetermined width and may not recognize them as gutters in a case that the widths GLW and GRW are less than the predetermined width. The predetermined width is, for example, a width into which one foot of a pedestrian can enter.

For example, the structure recognition unit 132 may recognize a space having a predetermined depth or more as a gutter and may not recognize a space less than the predetermined depth as a gutter. In a case that water has accumulated in the gutter, the structure recognition unit 132 cannot recognize the depth of the gutter. For that reason, in a case that an area recognized as a water surface from the analysis of images captured by the camera 10 extends along the lane dividing line LL or LR, the structure recognition unit 132 recognizes the area as a gutter even in a case that the area is not recognized as an area having a predetermined depth or more.

The structure recognition unit 132 may recognize lids GC placed on the side gutters GL and GR. In this case, the structure recognition unit 132 analyzes images captured by the camera 10 to acquire the luminance and separately recognizes the side gutter GL and the lid GC based on differences in the acquired luminance. The structure recognition unit 132 may detect distances to objects acquired by the finder 14 and recognize three-dimensional shapes of the side gutter GL and the lid GC based on differences in the detected distances, thereby separately recognizing the side gutter GL and the lid GC. For example, the lid GC is an object which is assumed to be able to withstand a load in a case that a pedestrian P passes over the lid GC. The lid GC is, for example, a plate-like body formed of an iron plate, a wooden plate, concrete or the like, or a grating formed of steel members assembled into a lattice shape to form a lid shape. The grating has a draining function for the side gutter in a case that placed on the side gutter.

The structure recognition unit 132 may recognize a distance GLD of the side gutter GL and a distance GRD of the side gutter GR (GRD1 and GRD2 in the example of FIG. 3) over which the recognized side gutters GL and GR are continuous along the road RE The structure recognition unit 132 may recognize the distance GCD (GCD1 and GCD2 in the example of FIG. 3) of the lid GC over which the recognized lid GC is continuous along the road RE The phrase "lid GC is continuous along the road R1" means that it is continuous without gaps, or that, even if there is a gap between lids, it is a small gap which a pedestrian's foot or a wheel of the own vehicle M is not able to enter. The structure recognition unit 132 may recognize a height of the lid GC.

In the case where roadside objects such as side gutters are continuously present in a section having a long distance from one intersection to the next intersection, since a pedestrian should have already recognized the side gutters, it is unlikely for the pedestrian to fall into the side gutters and for injuries and accidents to be caused in a case that the own vehicle M passes. For that reason, the structure recognition unit 132 may recognize a structure having a length which extends along the road less than a predetermined distance among the above-described distances GLD, GRD or GCD as a predetermined structure. That is, in a case that the side gutters GL and GR, or the lid GC is continuously present for a predetermined distance or longer, the structure recognition unit 132 may not recognize the structure as the predetermined structure.

In a case that the predetermined structure is recognized, the structure recognition unit 132 may recognize the distance between the predetermined structure and the own vehicle M. In a case that the recognition unit 130 recognizes a pedestrian in the traveling direction of the vehicle M, the structure recognition unit 132 may recognize the distance between the pedestrian and the predetermined structure.

[Function of Specific Behavior Recognition Unit]

Figure 4:
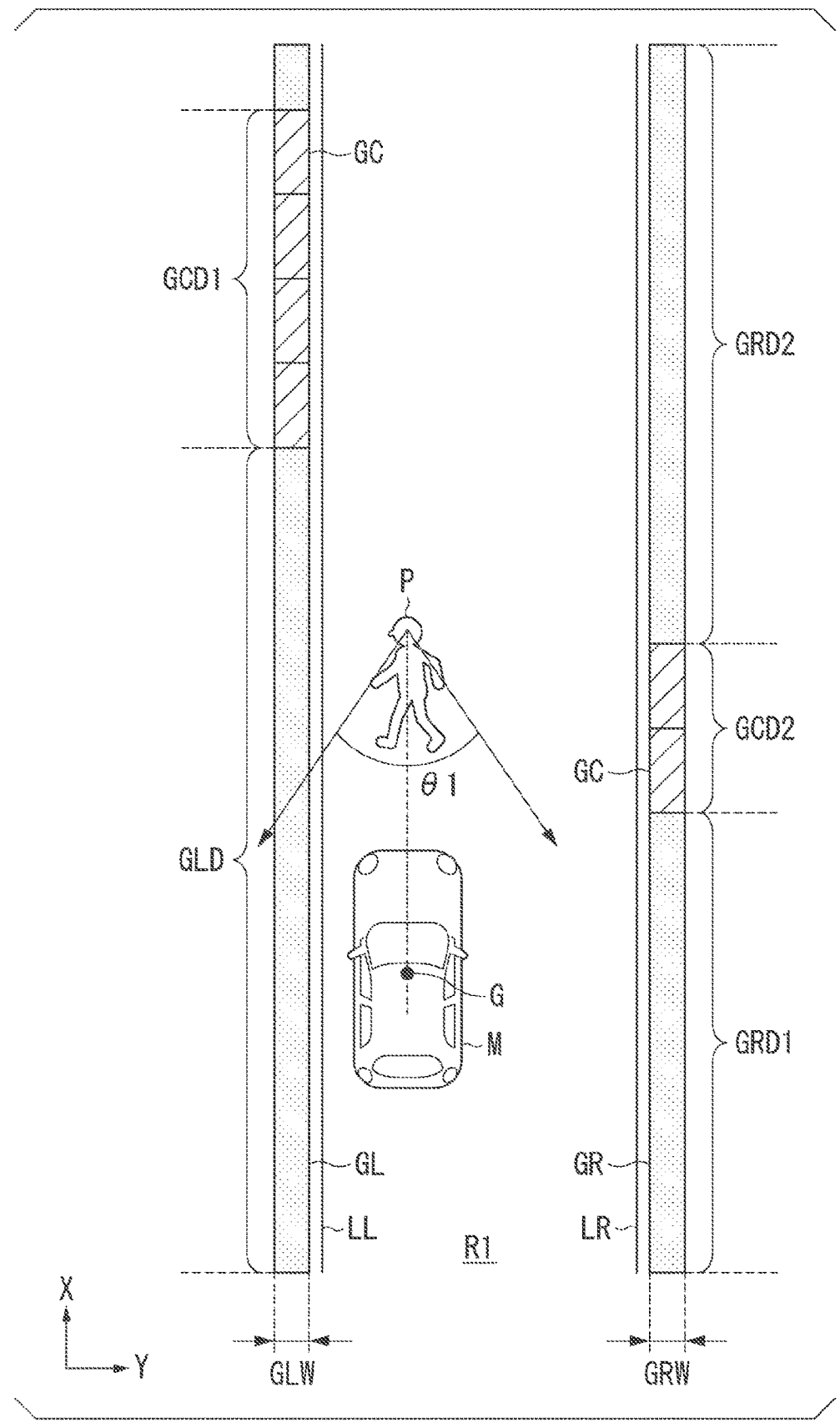
FIG. 4 is a diagram for explaining an example of processing of a specific behavior recognition unit.

The specific behavior recognition unit 134 recognizes a specific behavior of a pedestrian recognized by the recognition unit 130. The specific behavior is, for example, a behavior of the head or eyes for estimating a direction of a sight line of the pedestrian, or a predetermined gesture thereof. FIG. 4 is a diagram for explaining an example of processing of the specific behavior recognition unit 134. In the example of FIG. 4, a scenario where a pedestrian P is present in the traveling direction of the own vehicle M is shown in the same surrounding situations as in FIG. 3.

In this case, for example, the specific behavior recognition unit 134 analyzes images captured by the camera 10 and recognizes the position and orientation of the face of the pedestrian P based on the luminance information and the shape information of the analyzed images. The specific behavior recognition unit 134 identifies an eye area from feature information of the face analyzed from the images and recognizes the direction of the sight line of the pedestrian P from the position of an iris or a pupil in the identified eye area.

For example, the specific behavior recognition unit 134 recognizes a predetermined gesture of the pedestrian P from images captured by the camera 10. The predetermined gesture may be, for example, a gesture or hand gesture to allow the own vehicle M to overtake the pedestrian P. Specifically, for example, the specific behavior recognition unit 134 recognizes a behavior of the pedestrian P nearing a road end side as a specific behavior. The specific behavior recognition unit 134 recognizes a gesture of the pedestrian P standing still while facing a center side of the road R1 or a hand gesture of the pedestrian P instructing the traveling direction of the vehicle M with a hand or a finger as a specific behavior.

[Function of Vehicle Recognition Determination Unit]

The vehicle recognition determination unit 136 determines whether or not the pedestrian P has recognized the own vehicle M based on the specific behavior recognized by the specific behavior recognition unit 134. For example, the vehicle recognition determination unit 136 determines whether or not the orientation of the face of the pedestrian P recognized by the specific behavior recognition unit 134 is within a range of a first angle θ1 with respect to a line connecting a position of the face and a reference point G of the own vehicle. In a case that the orientation of the face is determined to be included within the range of the first angle θ1, the vehicle recognition determination unit 136 determines that the pedestrian P has recognized the own vehicle M. On the other hand, in a case that the orientation of the face is determined not to be included within the range of the first angle θ1, the vehicle recognition determination unit 136 determines that the pedestrian P is not recognizing the own vehicle M.

The vehicle recognition determination unit 136 may determine whether or not the sight line recognized by the specific behavior recognition unit 134 is within a range of the second angle θ2 (not shown). The second angle θ2 may be the same angle as the first angle θ1 or may be an angle different therefrom. The second angle θ2 is set with respect to the line connecting the position of the face and the reference point G of the vehicle. In a case that the sight line of the pedestrian P is determined to be included within the range of the second angle θ2, the vehicle recognition determination unit 136 determines that the pedestrian P has recognized the own vehicle M, and in a case that the sight line of the pedestrian P is determined to not be included within the range of the second angle θ2, the vehicle recognition determination unit 136 determines that the pedestrian P is not recognizing the own vehicle M.

The vehicle recognition determination unit 136 may determine whether or not the pedestrian P has recognized the own vehicle M based on a predetermined gesture recognized by the specific behavior recognition unit 134. Specifically, in a case that the predetermined gesture is recognized by the specific behavior recognition unit 134, the vehicle recognition determination unit 136 determines that the pedestrian P has recognized the own vehicle M, and in a case that the predetermined gesture is not recognized, the vehicle recognition determination unit 136 determines that the pedestrian P is not recognizing the own vehicle M.

[Function of Overtaking Driving Control Unit]

Figure 5:
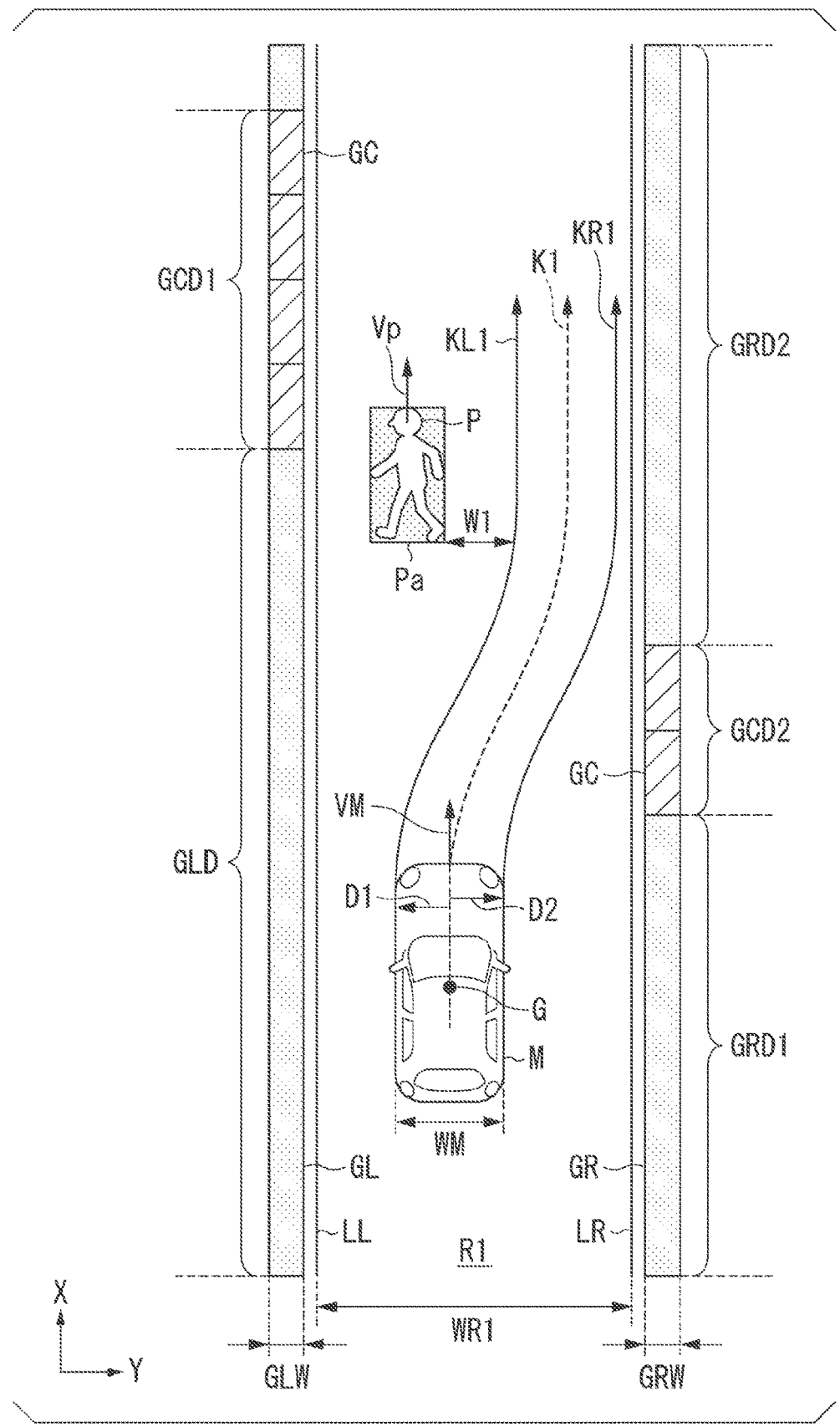
FIG. 5 is a diagram for explaining an example of processing of an overtaking driving control unit.

In a case that the pedestrian P present in the traveling direction of the own vehicle M is recognized by the recognition unit 130, the overtaking driving control unit 142 determines whether or not the pedestrian P is an overtaking target, and in a case that the pedestrian P is determined to be an overtaking target, a target trajectory for the own vehicle M to overtake the pedestrian P is generated. FIG. 5 is a diagram for explaining an example of processing of the overtaking driving control unit 142.

In a case that the pedestrian P present in the traveling direction of the host vehicle M is recognized by the recognition unit 130, the overtaking driving control unit 142 determines whether or not a relative speed Vr of the traveling speed VM of the own vehicle M with respect to a walking speed Vp of the pedestrian P(=VM−Vp) is equal to or greater than a predetermined speed Vth. In a case that the relative speed Vr is equal to or higher than the predetermined speed Vth, the overtaking driving control unit 142 determines the pedestrian P as an overtaking target. On the other hand, in a case that the relative speed Vr is less than the predetermined speed Vth, the overtaking driving control unit 142 generates a target trajectory that follows the pedestrian P without recognizing the pedestrian P as an overtaking target. More specifically, the overtaking driving control unit 142 controls the speed VM of the own vehicle M to a speed of ±5 [km/h] of the speed Vp of the pedestrian P, and causes the own vehicle M to travel such that the distance between the pedestrian P and the own vehicle M is maintained at a predetermined distance.

In a case that the pedestrian P is determined to be an overtaking target, the overtaking driving control unit 142 determines whether or not the side gutters GL and GR are recognized by the structure recognition unit 132. In a case that the side gutters GL and GR are absent, the overtaking driving control unit 142 sets a contact estimation area Pa, which is estimated that there is a possibility of contact with the pedestrian P, based on contour information of the pedestrian P recognized by the recognition unit 130. The overtaking driving control unit 142 provisionally sets a target trajectory K1 through which the center of the vehicle M (for example, the center G in longitudinal and lateral directions with respect to the entire length and width of the vehicle) passes, and generates an offset trajectory KL1 in the lateral direction (the road width direction; the Y direction in the drawings) of the provisionally set target trajectory K1, which is as offset as a distance D1 to a left end of the own vehicle M. Then, in a case that overtaking the pedestrian P through a right side thereof, the overtaking driving control unit 142 generates the target trajectory K1 such that an interval between the offset trajectory KL1 and the contact estimated area Pa is greater than or equal to a first minimum interval W1.

Figure 6:
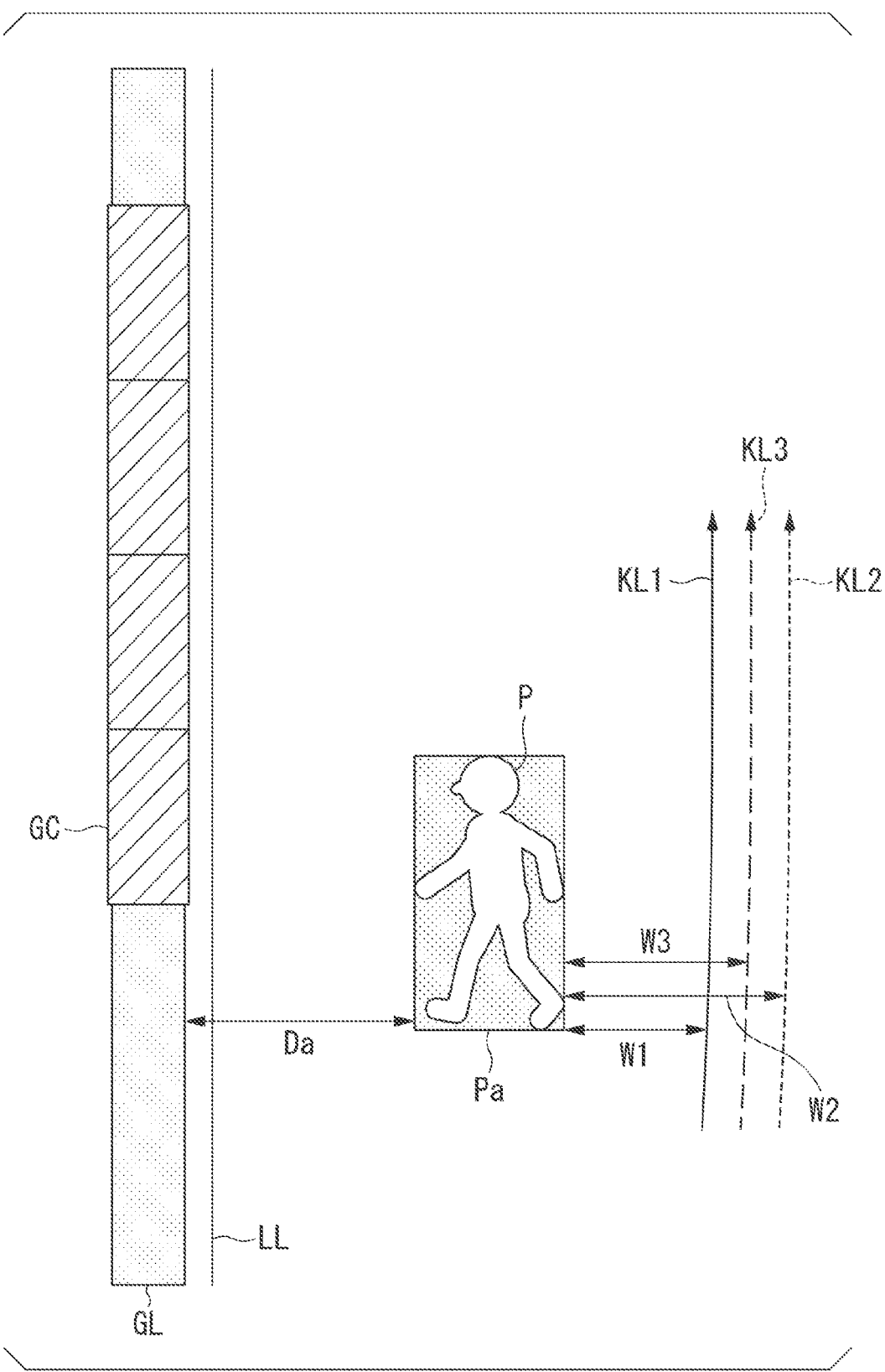
FIG. 6 is a diagram for explaining that a minimum interval between an own vehicle and a pedestrian is made larger than a first minimum interval.

In a case that the structure recognition unit 132 recognizes that the gutter GL is present in a direction opposite to the direction in which the host vehicle M overtakes the pedestrian P, the overtaking driving control unit 142 makes a minimum interval between the own vehicle M and the pedestrian P larger than the first minimum interval W1. FIG. 6 is a diagram for explaining that the minimum interval between the own vehicle M and the pedestrian P is made larger than the first minimum interval W1. FIG. 6 is a diagram excerpted with the pedestrian P shown in FIG. 5 as a center. In a case that the pedestrian P is recognized as an overtaking target by the recognition unit 130, the gutter GL is recognized in the traveling direction of the own vehicle M by the structure recognition unit 132, and the own vehicle M performs control to overtake the pedestrian by traveling on a side opposite to the predetermined structure in the road width direction as viewed from the traffic side, the overtaking driving control unit 142 sets the minimum interval between the offset trajectory KL1 and the contact estimated area Pa to a second minimum interval W2 larger than the first minimum interval W1, and generates a target trajectory in which an offset trajectory KL2 is positioned at the set second minimum interval W2. An increased amount of the distance from the first minimum interval W1 to the second minimum interval W2 may be a fixed value or may be set based on a vehicle width WM of the own vehicle M and a road width WR1 of the road RE As described above, since the overtaking driving control unit 142 generates the target trajectory such that the distance from the pedestrian P is made larger than in the case where there is no side gutter in a case that performing the driving control for overtaking the pedestrian P, it is possible to inhibit the pedestrian P from being accidentally moved into the side gutter GL in a panic due to the presence of the own vehicle M.

Further, in a case that the vehicle recognition determination unit 136 determines that the pedestrian P is recognizing the presence of the own vehicle M, the overtaking driving control unit 142 sets the minimum interval between the own vehicle M and the pedestrian P to a third minimum interval W3. Specifically, as shown in FIG. 6, the overtaking driving control unit 142 sets the third minimum interval W3 which is not less than the first minimum interval W1 and is less than the second minimum interval W2, and generates the target trajectory such that the offset trajectory KL3 passes through a position equal to or longer than the set interval. In this way, since the pedestrian P will not be surprised at the presence of the own vehicle M in a case that overtaking in the case where the pedestrian P is recognizing the own vehicle M, it is possible to cause the vehicle to travel more closely with the minimum interval than in a case that the own vehicle M is not recognized. Therefore, it is possible to smoothly pass through a narrow road or the like.

As shown in FIG. 5, in a case that the structure recognition unit 132 recognizes the gutter GR on the right side of the road R1, the overtaking driving control unit 142 sets an offset trajectory KR1 in the lateral direction of the provisionally set target trajectory K1, which is as offset as the distance D2 to a right wheel of the own vehicle M, and generates the target trajectory K1 such that the offset trajectory KR1 does not overlap the gutter GR. Thus, it is possible to inhibit the wheels of the own vehicle M from fitting into the gutter GR in a case that the own vehicle M overtakes the pedestrian.

In a case that there is no width to overtake the pedestrian P and the target trajectory K1 for overtaking the pedestrian P cannot be generated, the overtaking driving control unit 142 generates a target trajectory following the pedestrian P. Even in a case that there is a width for overtaking the pedestrian P, if the distance between the pedestrian P recognized by the recognition unit 130 and the side gutter GL is within a predetermined distance, the overtaking driving control unit 142 may suppress the control to overtake the pedestrian P. For example, as shown in FIG. 6, the overtaking driving control unit 142 determines whether or not the distance Da between the contact estimation region Pa and the side gutter GL recognized by the structure recognition section 132 is equal to or less than a predetermined distance Dth. In a case that the distance Da is equal to or less than the predetermined distance Dth, the overtaking driving control unit 142 does not generate a target trajectory for overtaking the pedestrian P. With this, excessive overtaking driving can be suppressed. In this case, the overtaking driving control unit 142 generates a target trajectory following the pedestrian P, for example.

In a case that it is determined that the pedestrian P has recognized the presence of the own vehicle M in a state in which the control for overtaking the pedestrian P is suppressed (in other words, in a state following the pedestrian P), the overtaking driving control unit 142 may generate a target trajectory to overtake the pedestrian P. In this way, in a case that the pedestrian P recognizes the presence of the host vehicle M, the pedestrian P will not be surprised by the sudden appearance of the own vehicle M, it is possible to smoothly pass through a narrow road or the like by performing the overtaking driving.

[Function of Adverse Effect Level Deriving Unit]

The adverse effect level deriving unit 144 derives an adverse effect level, which is an evaluated result of adverse effects due to approaching the pedestrian P to the side gutter, based on a type of predetermined structure recognized by the recognition unit 130, and outputs the derived adverse effect level to the outside of vehicle notification control unit 180. Specifically, the adverse effect level deriving unit 144 checks adverse effect conditions of the adverse effect level information 192 stored in the storage unit 190, for example, based on adverse effect conditions such as the distance Da between the side gutter and the pedestrian P recognized by the structure recognition unit 132, the gutter width of the side gutter GL, the depth of the gutter, or the presence or absence of the lid GC, and in a case that an adverse effect condition of the adverse effect level information 192 is met, the adverse effect level deriving unit 144 acquires an adverse effect level corresponding to the matched adverse effect condition. The term "match" includes not only exact matches but also partial matches.

FIG. 7 is a diagram showing an example of contents of the adverse effect level information 192. The adverse effect level information 192 associates an adverse effect level with an adverse effect condition. The adverse effect conditions are, for example, the distance Da [cm] from the position of the pedestrian to the side gutter, the gutter width GLW (GRW) [cm], the depth of the gutter [cm], the presence or absence of the lid GC provided on the side gutter and the like. For example, a higher value is set for the adverse effect level as a possibility that the pedestrian P fits into the side gutter GL becomes higher or a possibility that the pedestrian P falls into the side gutter GL and leads to an injury or accident becomes higher. Therefore, the value of the adverse effect level becomes higher, for example, as the distance from the pedestrian to the side gutter becomes smaller, the gutter width is larger, or the depth of the gutter becomes deeper. In the case where the lid GC is not recognized to be placed on the side gutter, the adverse effect level becomes higher as compared with the case where the lid GC is recognized to be placed thereon. In the case where the lid GC is placed on the side gutter, there is a possibility that a pedestrian may be stumbled or falling because of a step due to the height of the lid GC, and therefore it has a certain degree of adverse effect level.

[Function of Vehicle Outside Notification Control Unit]

In a case that the own vehicle M overtakes a pedestrian P, the outside of vehicle notification control unit 180 notifies the pedestrian using the outside of vehicle notification unit 82 in order to cause the pedestrian P to notice the own vehicle M. Specifically, the outside of vehicle notification control unit 180 checks and compares the adverse effect level derived by the adverse affect level deriving unit 144 with the adverse effect level of the notification information 194 stored in the storage unit 190, and acquires a notification content corresponding to the matched adverse effect level value. FIG. 8 is a diagram showing an example of the content of the notification information 194. The notification information 194 associates a notification content and a notification start distance [m] to an adverse effect level. The notification content becomes an alarm content (attention alerted) which is more friendly to the pedestrian P (the pedestrian P is not surprised) as the value of the adverse effect level is higher so that the pedestrian P will not fall into the side gutter GL due to the movement of the pedestrian P surprised by the notification of the own vehicle M. The notification start distance is, for example, the distance between the own vehicle M and the pedestrian P from which the outside of vehicle notification unit 82 starts notifying. The notification start distance increases as the adverse effect level increases.

In the example of FIG. 8, for example, in a case that the adverse effect level is "4" (that is, in a case that the adverse effect level is high), the outside of vehicle notification control unit 180 notifies a predetermined message such as "vehicle passes" at the timing in a case that the distance between the own vehicle M and the pedestrian has reached 15 [m]. Thus, for example, in the case where the pedestrian P is present at a position close to the side gutter GL, since the outside of vehicle notification unit 82 performs notification with a distant position and restrains the notification content, it is possible for the pedestrian P to notice the presence of the own vehicle M without being surprised. On the other hand, in a case that the adverse effect level is "1" (that is, in a case that the adverse effect level is low), since the pedestrian P is present at a position away from the side gutter GL and the possibility that the pedestrian P fits into the side gutter GL is low, the outside of vehicle notification control unit 180 gives priority to causing the pedestrian P to notice the own vehicle M and performs notification with a speech message and a strong horn. The strong horn means, for example, increasing the volume of the horn or lengthening the notification duration.

[Processing Flow]

Figure 9:
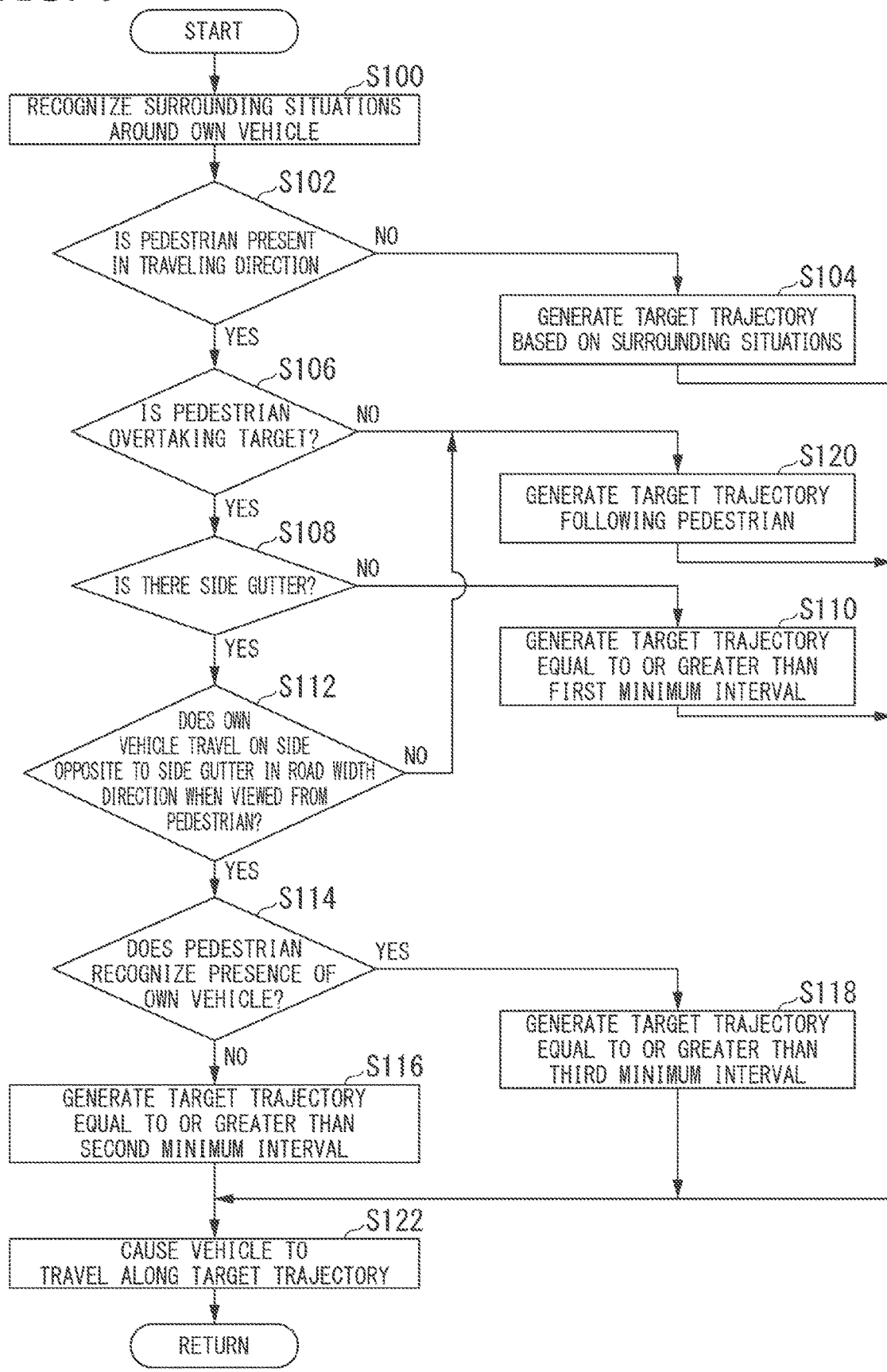
FIG. 9 is a flowchart showing a flow of processing executed by an automated driving control apparatus according to an embodiment.

FIG. 9 is a flowchart showing a flow of processing executed by the automated driving control device 100 according to an embodiment. The processing of this flowchart may be repeatedly executed at a predetermined cycle or at a predetermined timing, for example. The processing of this flowchart is assumed that automated driving is executed based on a target trajectory generated by the action plan generation unit 140 of the own vehicle M. The own vehicle M is assumed to travel along the target trajectory generated by the action plan generation unit 140 during the automated driving.

In the example of FIG. 9, the recognition unit 130 recognizes surrounding situations of the own vehicle M (step S100). Next, the recognition unit 130 determines whether or not a pedestrian is present in the traveling direction of the own vehicle M (step S102). When it is determined that there is no pedestrian in the traveling direction, the action plan generation unit 140 generates a target trajectory based on the surrounding situations (step S104).

When it is determined that a pedestrian is present in the traveling direction of the own vehicle M, the overtaking driving control unit 142 determines whether or not the pedestrian present in the traveling direction is a pedestrian as an overtaking target (step S106). If the pedestrian is an overtaking target, the overtaking driving control unit 142 determines whether or not a side gutter is present on the road on which the own vehicle M is traveling using the structure recognition unit 132 (step S108). If it is determined that there is no side gutter, the overtaking driving control unit 142 generates a target trajectory where the minimum interval between the own vehicle M and the pedestrian is equal to or more than the first minimum interval in the case where the own vehicle M passes the pedestrian (Step S110).

In the processing of step S108, if it is determined that there is a side gutter, the overtaking driving control unit 142 determines whether or not to travel on a side opposite to the side gutter in the road width direction when viewed from the pedestrian (step S112). When it is determined that the vehicle travels on the side opposite to the side gutter in the road width direction when viewed from the pedestrian, the overtaking driving control unit 142 determines whether or not the pedestrian is recognizing the presence of the own vehicle M (step S114) based on recognition results determined by the vehicle recognition determination unit 136. When it is determined that the pedestrian does not recognize the presence of the own vehicle M, the overtaking driving control unit 142 generates a target trajectory, in which the minimum interval between the own vehicle M and the pedestrian is equal to or greater than the second minimum interval larger than the first minimum interval, in the case where the own vehicle M passes the pedestrian (step S116). When it is determined that the pedestrian recognizes the presence of the own vehicle M, the overtaking driving control unit 142 generates a target trajectory, in which the minimum interval between the own vehicle M and the pedestrian is equal to or greater than the third minimum interval (for example, equal to or more than the first minimum interval and less than the second minimum interval), in the case where the own vehicle M passes the pedestrian (step S118).

When the pedestrian is not determined as an overtaking target in the processing of step S106, or the own vehicle M is determined not to travel on the side opposite to the side gutter in the road width direction when viewed from the pedestrian in the processing of step S112, the overtaking driving control unit 142 generates a target trajectory in which the own vehicle M follows the pedestrian (step S120). Next, the second control unit 160 causes the own vehicle M to travel along the target trajectory generated by the processing of steps S104, S110, S116, S118, or S120 (step S122). As a result, the processing of this flowchart ends.

According to the above-described embodiment, the vehicle control device includes the recognition unit 130 which recognizes the surrounding situations of the own vehicle, and the driving control unit (140 and 160) which automatically controls at least steering of the own vehicle M based on the surrounding situations recognized by the recognition unit. In a case that the recognition unit 130 recognizes a traffic participant as an overtaking target and a predetermined structure in the traveling direction of the own vehicle M, and the own vehicle M travels on a side opposite to the side gutter in the road width direction in a case that viewed from a pedestrian to overtake the pedestrian, the driving control unit (140 and 160) increases the distance between the own vehicle M and the pedestrian as compared to the case where the traffic participant as the overtaking target is recognized in the traveling direction of the vehicle and the side gutter is not recognized. In this way, it is possible to realize more preferable driving control by taking into account that the behavior of the traffic participant may be restricted by the surrounding situations.

Specifically, in the present embodiment, in a case that a traffic participant as an overtaking target and a predetermined structure are recognized in the traveling direction of the own vehicle M, it is determined that the traffic participant has not recognized the presence of the own vehicle M, and the own vehicle M travels on the side opposite to the predetermined structure in the road width direction in a case that viewed from the traffic participant to overtake the traffic participant, the vehicle is caused to travel with an interval equal to or greater than the second minimum interval between the own vehicle and the traffic participant. In the present embodiment, in a case that it is determined that the traffic participant has recognized the presence of the own vehicle M, the own vehicle M is caused to travel with an interval equal to or greater than the third minimum interval which is shorter than the second minimum interval between the own vehicle M and the traffic participant. In other cases, the own vehicle is caused to travel with an interval equal to or greater than the first minimum interval which is shorter than the third minimum interval between the own vehicle and the traffic participant. Thus, it is possible to realize more preferable driving control in accordance with the surrounding situations and the behavior of the traffic participant in a case that overtaking the traffic participant.

According to the present embodiment, by controlling to increase the interval between the traffic participant and the host vehicle M in a case that the side gutter is recognized, it is possible to reduce the possibility of contact with the traffic participant in a case that the vehicle M overtakes the traffic participant, and prevent the traffic participant from erroneously falling into the side gutter in order to avoid the own vehicle M (a pedestrian protection mode). In the above-described embodiment, in a case that there are a plurality of traffic participants, the driving control for reducing the possibility of contact with all traffic participants and preventing the traffic participants from accidentally falling into the side gutters to avoid the own vehicle M is executed. According to the present embodiment, in a case that passing the traffic participant, it is possible to smoothly pass through a narrow road or the like by generating a target trajectory that prevents the wheels of the own vehicle M from falling into the side gutter (an own vehicle protection mode). According to the present embodiment, it is possible to change the notification content from the own vehicle M for the traffic participant based on the adverse effect level. Therefore, in a case that the adverse effect level is high, it is possible to notify the pedestrian gently and early, and inhibit an injury and accident of the traffic participant caused by the traffic obstructing factor such as the side gutters.

[Hardware Configuration]

Figure 10:
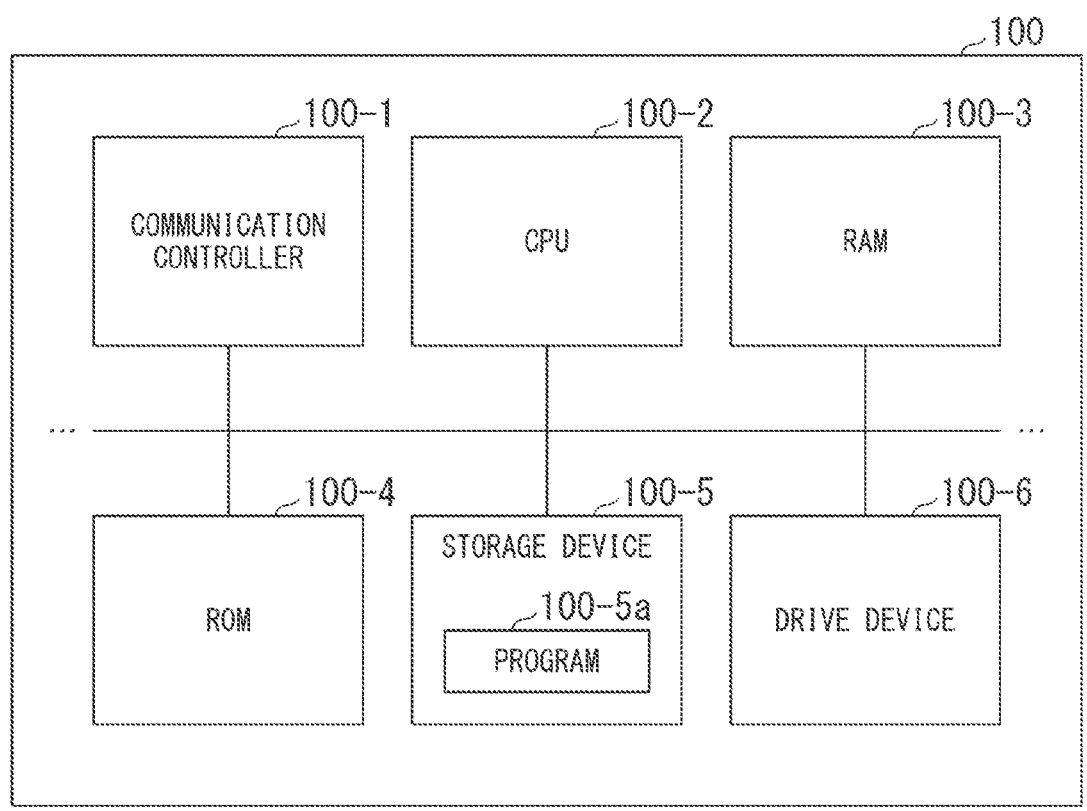
FIG. 10 is a diagram showing an example of a hardware configuration of an automated driving control apparatus according to an embodiment.

FIG. 10 is a diagram showing an example of a hardware configuration of the automated driving control device 100 according to an embodiment. As shown in the figure, the automated driving control device 100 has a configuration in which a communication controller 100-1, a CPU 100-2, a RAM 100-3 used as a working memory, a ROM 100-4 storing a boot program and the like, a storage device 100-5 such as a HDD or a flash memory, a drive device 100-6, etc., are mutually connected by an internal bus or a dedicated communication line. The communication controller 100-1 communicates with components other than the automated driving control device 100. A portable storage medium (for example, a computer readable non-temporary storage medium) such as an optical disk is mounted on the drive device 100-6. A program 100-5a executed by the CPU 100-2 is stored in the storage device 100-5. This program is developed in the RAM 100-3 by a direct memory access (DMA) controller (not shown) or the like and executed by the CPU 100-2. Further, the program 100-5a referred to by the CPU 100-2 may be stored in the portable storage medium mounted on the drive device 100-6 or may be downloaded from another device via a network. As a result, some or all of the first control unit 120, the second control unit 160, the outside of vehicle notification control unit 180, and the storage unit 190 of the automated driving control device 100 are realized.

The above-described embodiment can be expressed as follows.

A vehicle control device configured by including:
a storage device storing a program; and
a hardware processor,
in which the hardware processor executes a program stored in the storage device to perform the processing of:
recognizing surrounding situations of a vehicle;
executing a driving control unit which automatically controls at least steering of the vehicle based on the recognized surrounding situations; and
in a case that a traffic participant as an overtaking target is recognized in a traveling direction of the vehicle, a predetermined structure is recognized in the traveling direction of the vehicle, and the vehicle travels on a side opposite to the predetermined structure in a road width direction in a case that viewed from the traffic participant to overtake the traffic participant, increasing an interval between the vehicle and the traffic participant, as compared to a case where the traffic participant as an overtaking target is recognized in the traveling direction of the vehicle and the predetermined structure is not recognized.

Although the embodiments for implementing the present invention have been described above, it should be appreciated that the present invention is not limited to these embodiments, and various modifications and substitutions may be made within the scope not departing from the gist of the present invention.

What is claimed is:

1. A vehicle control device comprising:
a recognition unit which recognizes surrounding situations of a vehicle; and
a driving control unit which automatically controls at least steering of the vehicle based on the surrounding situations recognized by the recognition unit,
wherein the driving control unit increases a distance between the vehicle and a traffic participant in the case where the recognition unit recognizes the traffic participant as an overtaking target and a predetermined structure in a traveling direction of the vehicle, and the vehicle travels on a side opposite to the predetermined structure in a road width direction in a case that viewed from the traffic participant to overtake the traffic participant, as compared to a case where the traffic participant as the overtaking target is recognized by the recognition unit in the traveling direction of the vehicle and the predetermined structure is not recognized.

2. The vehicle control device according to claim 1, wherein the recognition unit recognizes the distance in the road width direction between the traffic participant and the predetermined structure, and the driving control unit inhibits control for overtaking the traffic participant in a case that the distance is within a predetermined distance.

3. The vehicle control device according to claim 2, wherein the recognition unit further includes a vehicle recognition determination unit which determines whether or not the traffic participant has recognized the vehicle, and the driving control unit executes the control for overtaking the traffic participant in a case that the vehicle recognition determination unit determines that the traffic participant has recognized the presence of the vehicle.

4. The vehicle control device according to claim 1, wherein the recognition unit further includes a vehicle recognition determination unit which determines whether or not the traffic participant has recognized the vehicle, and the driving control unit causes the vehicle to travel with an interval equal to or greater than a second minimum interval between the vehicle and the traffic participant in the case where the recognition unit recognizes the traffic participant and the predetermined structure in the traveling direction of the vehicle, the vehicle recognition determination unit determines that the traffic participant has not recognized the presence of the vehicle, and the vehicle travels on the opposite side to overtake the traffic participant, the driving control unit causes the vehicle to travel with an interval equal to or greater than a third minimum interval which is shorter than the second minimum interval between the vehicle and the traffic participant in the case where the vehicle recognition determination unit determines that the traffic participant has recognized the presence of the vehicle, and the driving control unit causes the vehicle to travel with an interval equal to or greater than a first minimum interval which is shorter than the third minimum interval between the vehicle and the traffic participant in other cases.

5. The vehicle control device according to claim 1, wherein the predetermined structure is a structure which has a length extending along a road less than a predetermined distance.

6. The vehicle control device according to claim 1, wherein the recognition unit recognizes a type of predetermined structure, the vehicle control device further comprising:

an outside of vehicle notification unit which notifies information outside the vehicle; and an outside of vehicle notification control unit which derives an adverse effect level, which is a result of evaluating adverse effects of the traffic participant approaching the predetermined structure, based on the type of predetermined structure recognized by the recognition unit, and outputs information on the derived adverse effect level to the outside of vehicle notification unit.

7. A vehicle control method which causes a vehicle control device to execute the processing of:

recognizing surrounding situations of a vehicle;

automatically controlling at least steering of the vehicle based on the recognized surrounding situations; and increasing a distance between the vehicle and a traffic participant in the case where the traffic participant as an overtaking target and a predetermined structure are recognized in a traveling direction of the vehicle, and the vehicle travels on a side opposite to the predetermined structure in a road width direction in a case that viewed from the traffic participant to overtake the traffic participant, as compared to a case where the traffic participant as the overtaking target is recognized in the traveling direction of the vehicle and the predetermined structure is not recognized.

8. A computer-readable non-temporary storage medium storing a program which causes a vehicle control device to execute the processing of:

recognizing surrounding situations of a vehicle;

automatically controlling at least steering of the vehicle based on the recognized surrounding situations; and increasing a distance between the vehicle and a traffic participant in the case where the traffic participant as an overtaking target and a predetermined structure are recognized in a traveling direction of the vehicle, and the vehicle travels on a side opposite to the predetermined structure in a road width direction in a case that viewed from the traffic participant to overtake the traffic participant, as compared to a case where the traffic participant as the overtaking target is recognized in the traveling direction of the vehicle and the predetermined structure is not recognized.

* * * * *